(12) United States Patent
Stenman et al.

(10) Patent No.: US 7,028,186 B1
(45) Date of Patent: Apr. 11, 2006

(54) KEY MANAGEMENT METHODS FOR WIRELESS LANS

(75) Inventors: Jorma Stenman, Helsinki (FI); Harri Hansen, Espoo (FI); Juha Salvela, Espoo (FI)

(73) Assignee: Nokia, Inc., Burlington, MA (US)

( * ) Notice: Subject to any disclaimer, the term of this patent is extended or adjusted under 35 U.S.C. 154(b) by 0 days.

(21) Appl. No.: 09/502,567

(22) Filed: Feb. 11, 2000

(51) Int. Cl.
*H04L 9/00* (2006.01)

(52) U.S. Cl. ..................................... 713/173
(58) Field of Classification Search ................ 380/277, 380/247, 270, 278, 282, 283; 713/171, 173, 713/155

See application file for complete search history.

(56) References Cited

U.S. PATENT DOCUMENTS

| | | | | |
|---|---|---|---|---|
| 5,237,612 A | * | 8/1993 | Raith | 380/247 |
| 5,371,794 A | | 12/1994 | Diffie et al. | |
| 5,890,075 A | * | 3/1999 | Cyr et al. | 455/560 |
| 6,223,291 B1 | * | 4/2001 | Puhl et al. | 713/201 |
| 6,453,159 B1 | * | 9/2002 | Lewis | 455/411 |

OTHER PUBLICATIONS

Mcdonald et al., RFC 2367 "PF_KEY Key Management API, Version 2", IETF Jul. 1998.*
Piper, RFC 2407, "The Internet IP Security Domain of Interpretation for ISAKMP", IETF Nov. 1998.*
Harkins et al., RFC 2409, "The Internet Key Exchange IKE", IETF Nov. 1998.*
Kent et al., RFC 2401, "Security Architecture for the Internet Protocol", IETF Nov. 1998.*
Kent et al., RFC 2402, "IP Authentication Header", IETF Nov. 1998.*
Schneier, 1996, "Applied Cryptography", pp. 574-577.*
IEEE, 1999, MAC and PHY Specifications, Section 8, pp. 56-69.*
Simple Mobile IP, Johnsson, IETF, Mar. 1999.*
"Security Solution in Wireless LAN Systems", Ericsson Radio System, Online 1999, pp. 1-8, 11.
Kent et al "RFC 2401—Security Architecture for the Internet Protocol" IETF Network Working Group, Nov. 1998, pp. 1-66.

* cited by examiner

*Primary Examiner*—Gregory Morse
*Assistant Examiner*—Thomas Ho
(74) *Attorney, Agent, or Firm*—Foley & Lardner LLP; G. Peter Albert, Jr.

(57) ABSTRACT

The security keys in the mobile terminals and access points of a wireless local area network (WLAN) are created, utilized and managed for a communication session between a mobile terminal and access point. Both the WLAN link level security protection and IP security functions of the network use the same Internet Key Exchange (IKE) key management protocol and use certificates in the same certificate hierarchy. When the mobile terminals associates with the network, it uses the IKE protocol with private keys and certificates to generate WLAN link level keys with the access point and provide mutual authentication.

11 Claims, 5 Drawing Sheets

KEY MANAGEMENT METHODS FOR WIRELESS LANS

BACKGROUND

1. Field of the Invention

This invention relates generally to methods and systems for providing data communications through a network. A particular aspect of the invention relates to key management methods for wireless local area networks.

2. Description of the Related Art

In general, Wireless Local Area Networks (WLAN) are similar to conventional wired Ethernet Local Area Networks (LANs) in many respects. The primary distinction, of course, is that communications and access to the network for mobile terminals in a WLAN does not require a physical connection. Indeed, several Mobile Terminals (MTs) may access the network over the same frequency and air space.

There are two different WLAN types. An ad-hoc WLAN is a simple network where communications are established between multiple mobile terminals without the use of an access point or server. The other WLAN type, client-server networks, have a basic architecture as generally illustrated in FIG. 1. An Access Point (AP) serves as a base station to control and coordinate the transmission states of the various mobile terminals within a Basic Service Set (BSS). The access point usually supervises them when they roam from cell to cell. The access points also provide the mobile terminals with access to the WLAN and handle data traffic between to the wired or wirelss backbone (BB).

The access points also route and control the flow of traffic between mobile terminals in the WLAN and other networks. Just as in wired networks, an internetworking unit (IWU) uses protocol manipulation to connect the WLAN to a network with a different protocol. Some internetworking units are relatively common, such as IP routers which are used to connect LANs to the Internet via an Internet Service Provider (ISP).

The layer stack for a typical WLAN-IP Router-Internet connection is as shown in FIG. 2. As in any network, the bottom physical layer (PHY) defines the modulation and signaling characteristics for the transmission of data. In a WLAN, the physical layer defines such characteristics as transmission frequency, bandwidth and data rates, power output limits and spread spectrum techniques. Much as in an Ethernet network, the primary function of the next to bottom Media Access Control (MAC) layer is to prevent collisions between mobile terminals attempting to transmit data at the same time. An additional function of the MAC layer in a WLAN is power management and battery operation of the mobile terminals.

A relatively large number number of different WLAN products are currently available. Unfortunately, these products are developed by different manufacturers and are generally incompatible with each other. The Institute for Electrical and Electronic Engineers (IEEE) has recently completed development of its 802.11 WLAN standard which defines physical layer options for transferring data frames at 2.4 Ghz and sets forth MAC layer protocols. The 802.11 standard also includes certain network management services, registration and authentication services. Another emerging WLAN standard is the High Performance Radio Local Area Network (HIPERLAN2) for broadband data transmission at 5 GHz.

Regardless of the physical layer and MAC layer specifications, data transmission security is an essential part of WLAN development. Since there are no physical connections required and the mobile terminals use a wireless link to access the WLAN via an access point, additional security features are used to protect transmitted data and network elements. These features include data and signaling encryption at the MAC layer, authentication of the mobile terminal when it connects to the network, and the authentication of each data packet to assure that the packet was sent by the claimed mobile terminal. The mobile terminal can also authenticate the network (that is, the access point) and the received packets.

Some security provisions are included as an optional part of the IEEE 802.11 WLAN standards. In particular, data security on the wireless link level can be accomplished by a complex encryption technique known as Wired Equivalent Privacy (WEP). WEP protects the data transmitted over the shared frequency and air space using a 64-bit seed key and the RC4 encryption algorithm. A pseudo-random number generator is initialized by a shared secret key and outputs a key sequence of pseudo-random bits equal in length to the largest possible packet which is combined with the outgoing/incoming packet producing the packet transmitted in the air.

When enabled, WEP only protects the data packet information from being captured by other mobile terminals (or similar equipment) for eavesdropping or other purposes and does not protect the physical layer header. Although the other mobile terminals on the network cannot decrypt the data portions of the packet, they can listen to the control data needed to manage the network. WEP also does not prevent unauthorized access to the network.

Similar to wired LANs, most WLANs require a mobile terminal registering itself with the network, such as through an access point, to authenticate itself as an authorized user by providing a password. As another measure of security, a WLAN may additionally or alternatively require a mobile terminal to use a current ciphering "key" before obtaining access to the network.

Currently available WLAN products typically use symmetric pre-distributed keys. In other words, the mobile terminal's ciphering key is stored in the mobile terminal itself and is distributed to all of the access points by the network manager. These products have the drawback that it is unpractical to change the key frequently. Usually the key is created by the network manager when the mobile terminal is used for the first time, and is never changed after that. It also becomes difficult to manage the keys when the wireless network grows to be large in size.

BRIEF SUMMARY

An exemplary embodiment of the present invention is directed to methods of creating, utilizing and managing security keys for communication sessions between a mobile terminal and an access point in a wireless local area network. It addresses and solves the disadvantages of wireless networks discussed above. In particular, it addresses the need for efficient key management to accompany the link level security functions of currently available WLANs in order to prevent unauthorized access to the network.

In the exemplary embodiment, session keys are created for each communication session between a mobile terminal and one of the access points of the network rather than being pre-defined and stored in the mobile terminal. The exemplary embodiment thus solves at least one drawback discussed above insofar as no network maintenance is required when new mobile terminals or access points are added to the wireless network and no potential breach of security may occur related to such need for maintenance. The exemplary embodiment of the invention achieves much better security than conventional wireless networks by using new keys for every communication session.

Other important aspects taken into consideration by embodiments of the invention are data confidentiality, data authenticity, and service availability. For example, one preferred embodiment of the invention incorporates a widely used key management method in the network in order to allow continual service when roaming. The use of a standard public key protocol allows roaming to other networks. Thus, even global roaming is possible with a global key management method and a global certificate hierarchy.

In another exemplary embodiment of the invention, the IP (end-to-end) security functions and link level security protection are closely integrated. Both encryption and authentication are applied at the IPsec level in order to avoid using WEP. If all of the payload data traffic of the mobile terminal receives the protection of the IP security functions according to this exemplary embodiment, then WLAN link level encryption for the payload data traffic becomes unnecessary.

In another example embodiment of the invention, the IP security functions are used to authenticate MAC level message elements. Such use of standard protocols and interfaces available in the IP security functions reduces the work associated with the updating of the WLAN security functions.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation, the spirit and scope of the present invention being limited only by the terms of the claims in the patent issuing from this application.

DETAILED DESCRIPTION

The exemplary embodiments of the present invention described herein are directed to specific methods of creating, utilizing and managing security keys for communication sessions between a mobile terminal and an access point in a wireless local area network. The invention of course is not limited to such specific embodiments. It is more broadly directed to a diverse range of key management methods and systems for wireless networks. For example, although the exemplary embodiments of the invention are described with reference to the IEEE 802.11 WLAN standards, alternative embodiments could be directed to HIPERLAN2 radio local area networks.

Figure 1:
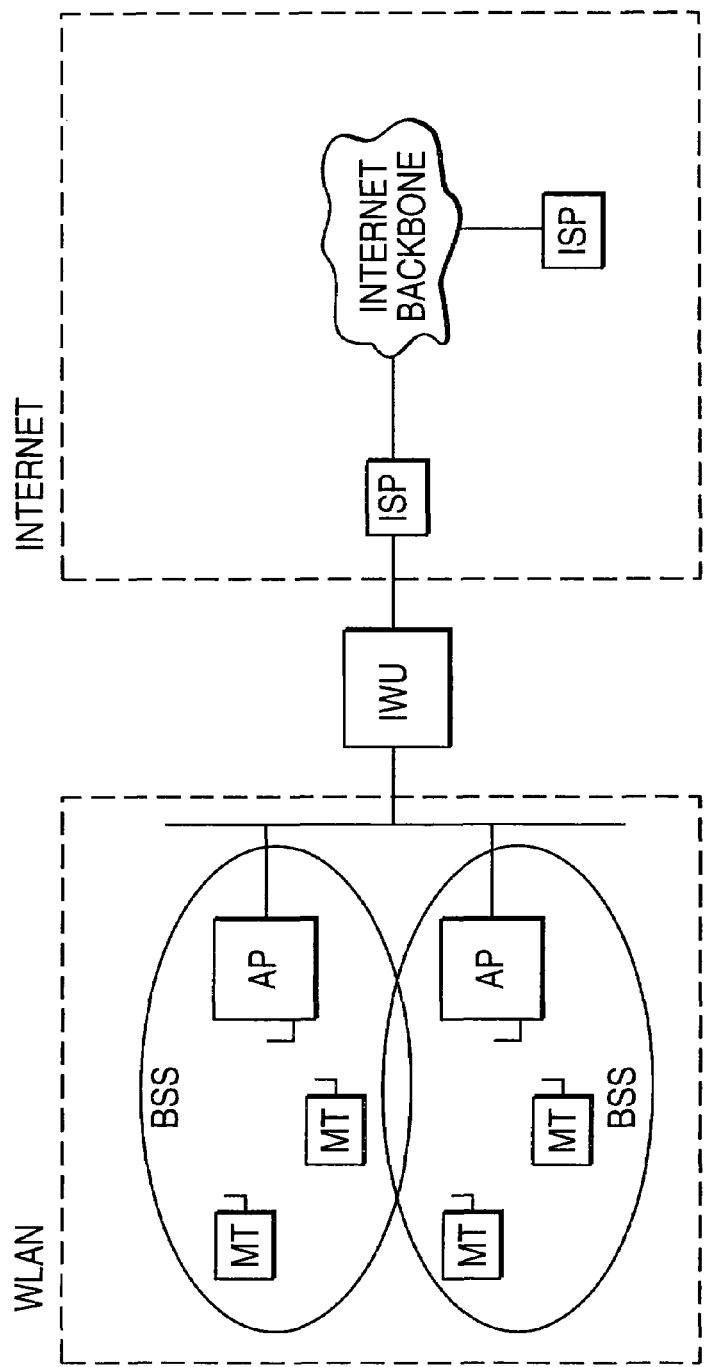
FIG. 1 is a block diagram showing the architecture of a wireless local area network.
Figure 2:
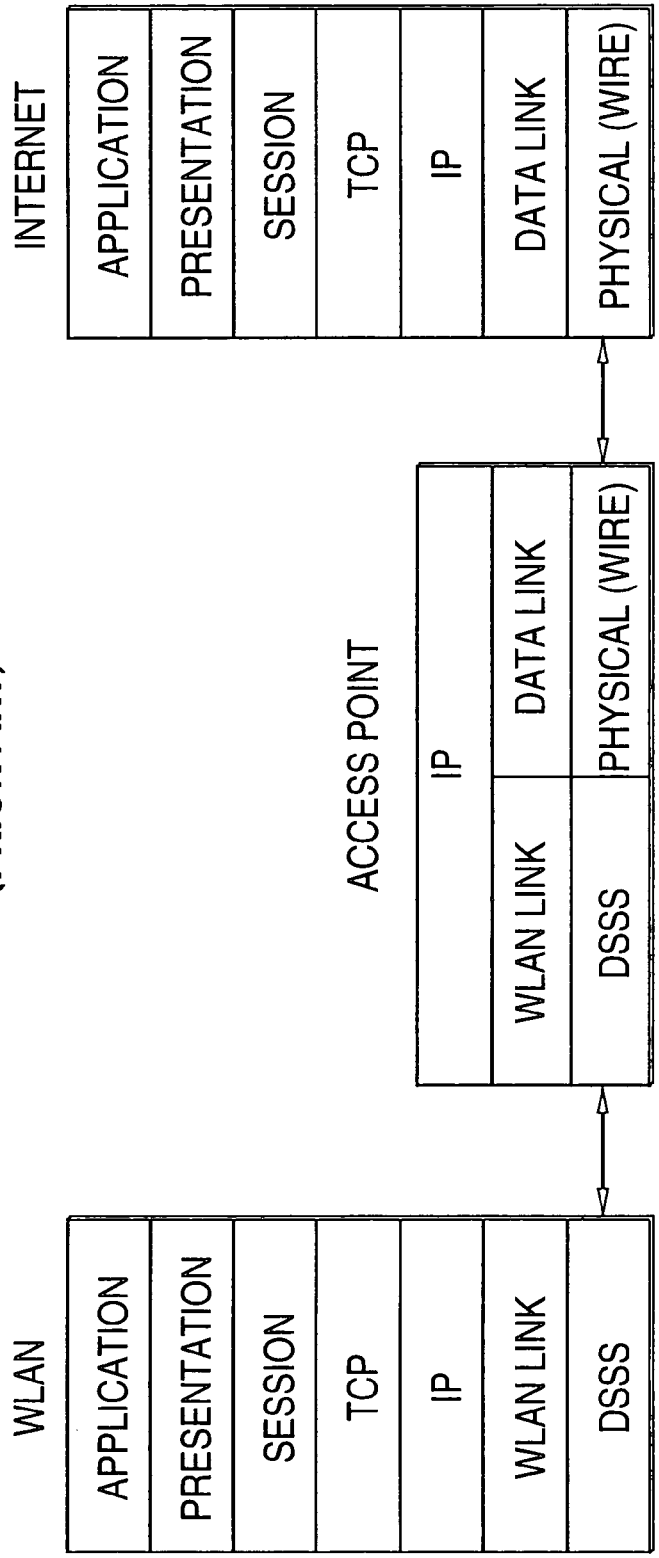
FIG. 2 shows the layer stack for a typical WLAN-IP Router-Internet connection, such as may be used in the network shown in FIG. 1.
Figure 3:
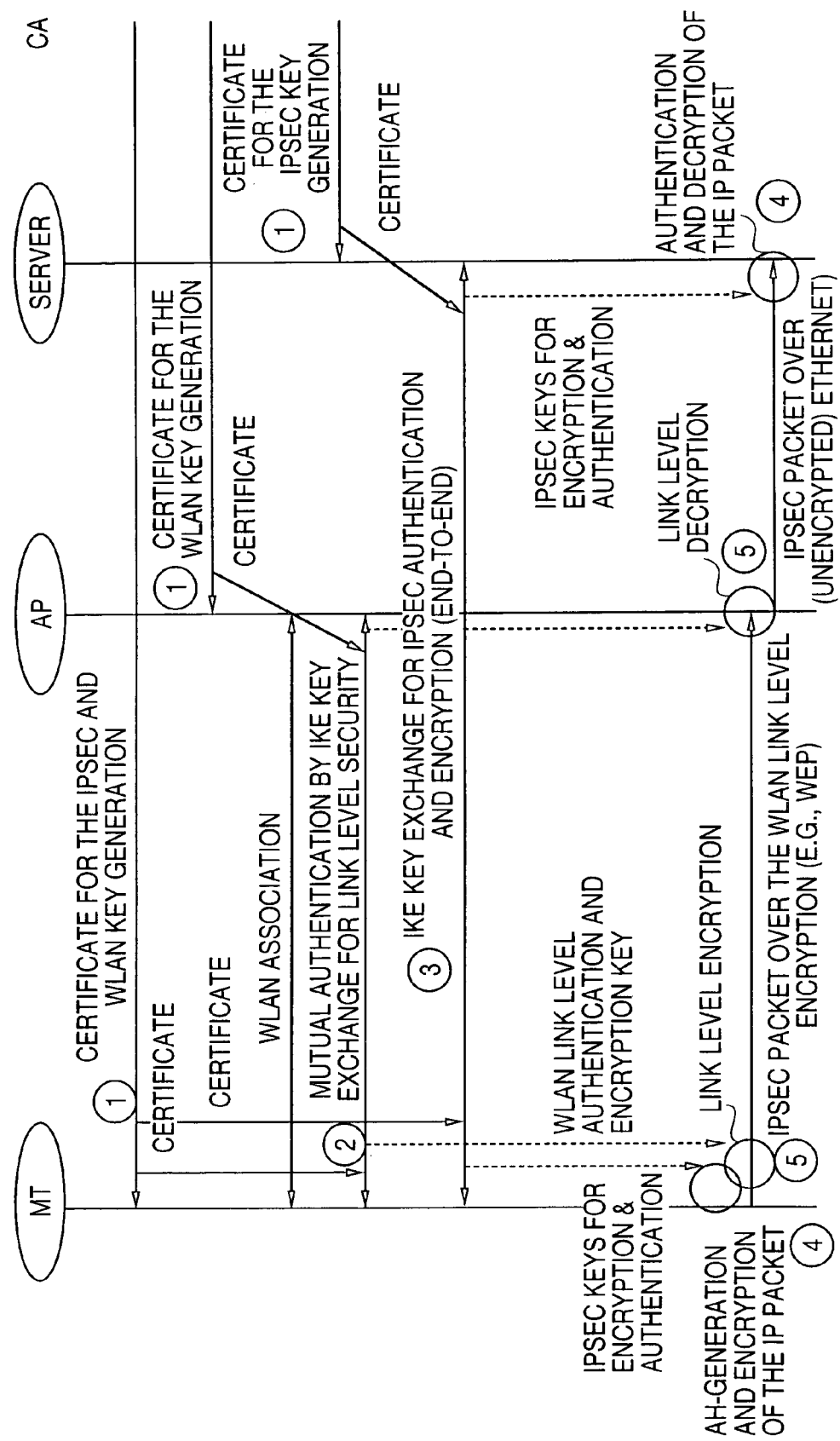
FIG. 3 is a flow diagram illustrating the combination of IP end-to-end security functions and WLAN link level security in a first exemplary embodiment of the invention.
Figure 4:
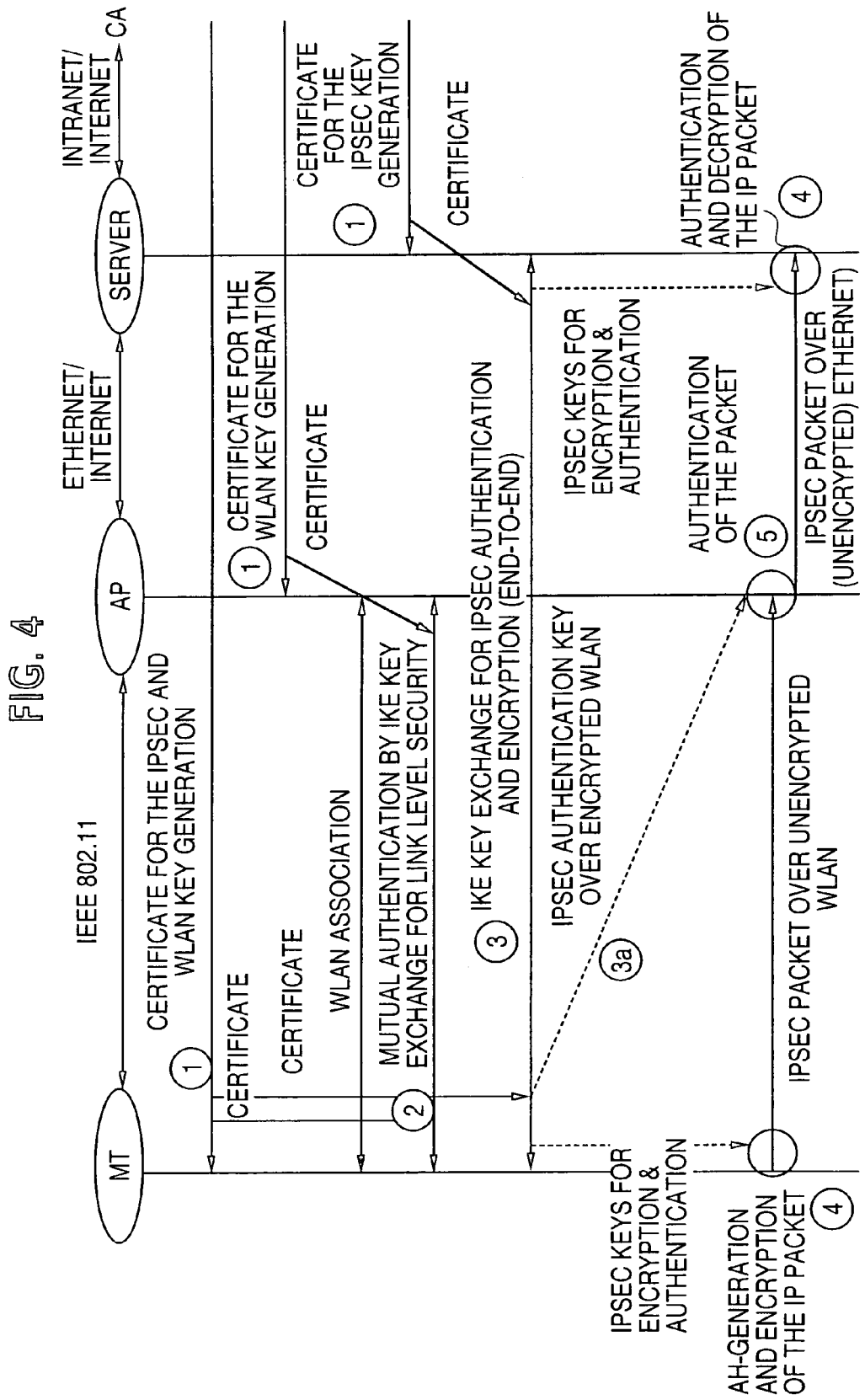
FIG. 4 is a flow diagram illustrating the use of uplink IP packet authentication in an access point without link level encryption in a second exemplary embodiment of the invention.
Figure 5:
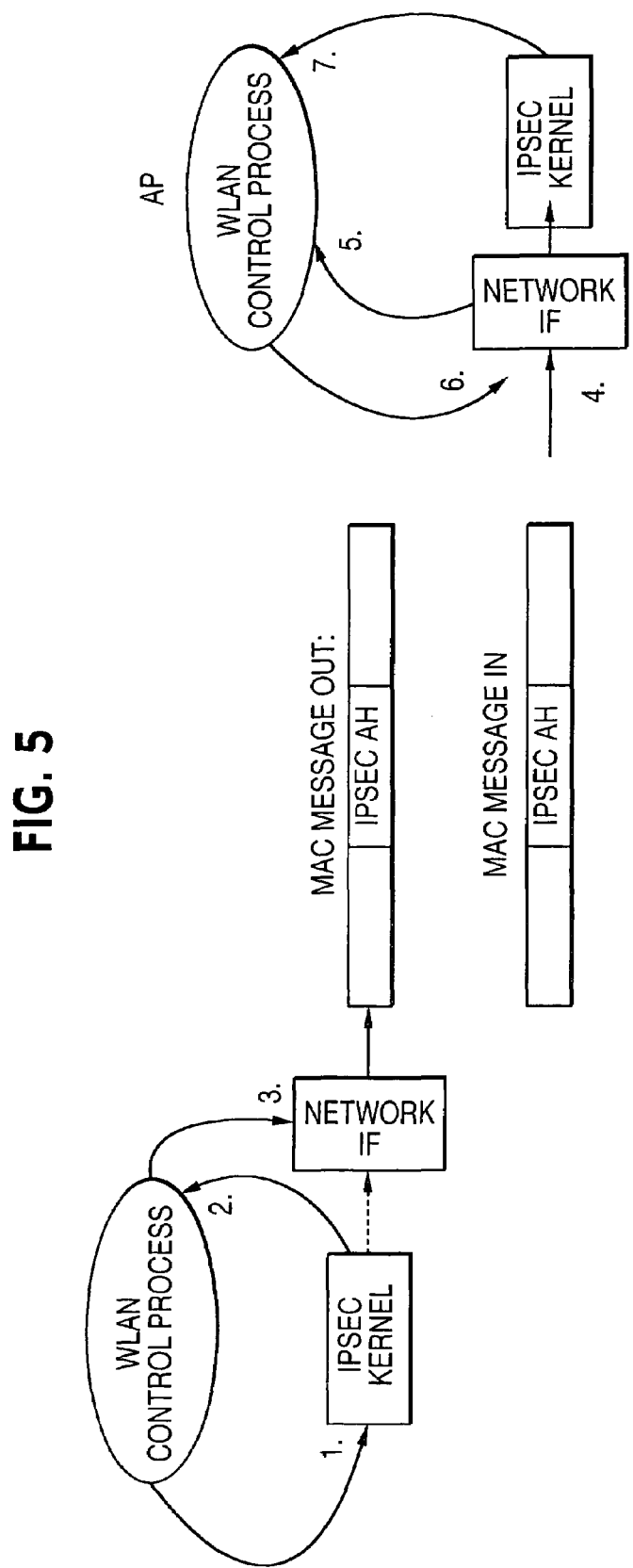
FIG. 5 is a generalized block diagram showing an IP authenticated message as part of a WLAN MAC-level message.

The exemplary embodiments described hereafter with reference to FIGS. 3–5 efficiently manage security keys in the mobile terminals and the access points of a wireless network by integrating the key management of the IP security functions and link level security protections. The main aspect of the embodiments is that both the WLAN link level security protection and IP security use the same key management protocol and the same certificate hierarchy (i.e., both have the same root Certificate Authority).

In particular, the example embodiments combine the use of the IKE (Internet Key Exchange) key management protocol and the linking of the WLAN and IP layer keys. IKE is described at length in RFC 2409 by D. Harkins et al, entitled "The Internet Key Exchange" and published by the Internet Engineering Task Force (IETF) in Nov. 1998, and is hereby incorporated by reference. IKE is now a commonly used key management protocol, and using it for the link level key management is beneficial.

As discussed above, additional security features, such as encryption and authentication, can be included in the WLAN link level. In the IEEE 802.11 WLAN standard, these features can be implemented through the encryption utilized in WEP. The elimination of a separate (perhaps proprietary) WLAN link level key management protocol makes the mobile terminals and access points simpler and easier to maintain.

FIG. 3 shows a specific example of how the IKE and the associated certificate hierarchy can be used both for IP level security and the WLAN link level security. As shown, the mobile terminal (MT) communicates with a server using IPsec authenticated and encrypted data packets. The IPsec protocol is described in detail in Request for Comments 2401 by S. Kent et al., entitled "Security Architecture for the Internet Protocol" and published by the Internet Engineering Task Force in Nov. 1998, and hereby incorporated by reference. It is an IP layer based security protocol for providing secure "end-to-end" communication of payload data packets between two IP hosts, at the option of the hosts when they believe that additional security is necessary, by authenticating and/or encrypting the data packets transferred between the hosts.

Although the authentication and/or encryption mechanisms used in the example embodiment of FIG. 3 do not differ from those described in the protocol, the data packets are instead always authenticated and encrypted as part of the standard (secure) operation of the WLAN whenever they are transferred between a mobile terminal and access point over the shared frequency and air space and not only when the mobile terminal or access point choose secured communication. This transfer can, but need not, be done using the WEP.

IPsec uses symmetric cryptography which requires same encryption or authentication keys at both ends. A scalable key management protocol, such as IKE, is used to generate the symmetric keys for the IPsec stack. The key exchange is based on public key cryptography and on certificates given by a trusted third party (usually called a Certificate Authority (CA)). The most common current use of the IPsec protocol is for building Virtual Private Networks (VPN) in IPv4.

In the example embodiment of FIG. 3, the mobile terminal, access point and Server first receive respective certificates (step 1) from a Certificate Authority belonging to the same certificate hierarchy (only one CA is shown in FIG. 3 merely for the sake of convenience).

The certificates can be stored in a certificate server, in an access point, in the mobile terminal itself or in a separate smart card which can be used with the mobile terminal. Optionally, an access point or mobile station can store each other's certificate in order to avoid the need to exchange them during each association process, thereby saving bandwidth and the delay introduced when the mobile terminal is turned on for transmission. Preferably, the certification authority certificate, own certificate and private key can be included in the access points and mobile terminals at the time of manufacture. In this case, there is no need to perform maintenance or network set-up when an access point or mobile terminal is added to a network. Alternatively, the network manager assigns the certificates to the mobile terminal or access point.

A mobile station is only able to transmit and receive data frames after association with an appropriate access point is completed. The association process comprises the transfer of information about the mobile station and its capabilities to the network so that it can determine which one of several different access points will communicate with the mobile station. When the mobile terminal first associates with a respective access point in the network, it uses the IKE with private key and the certificates to generate the WLAN link level keys with that access point (step 2). Mutual authentication of both the mobile terminal and access point is achieved by this process. If end-to-end IPsec security is employed according to the exemplary embodiment of the invention, the mobile terminal uses the IKE to generate the authentication keys and ciphering keys (step 3) with the network server. When transmitting packets, the IPsec kernel in the mobile terminal generates the Authentication Header (AH) and encrypts the packets. In the server, the packets are authenticated and decrypted (step 4). Link level session keys (e.g., with WEP) are used to encrypt traffic over the shared frequency and air space (step 5).

Although not shown in FIG. 3, an optional feature of the embodiment is to make the WLAN security adapt to the standard key management interface of the IPsec kernel (i.e., the PF_KEY socket interface described in RFC 2367 by D. McDonald et al, entitled "PF_KEY Key Management API, Version 2" and published by the Internet Engineering Task Force (IETF) in Jul. 1998, which is hereby incorporated by reference in its entirety). This prevents the need for any modifications to the IKE protocol, thus allowing the use of any IKE implementation. If a standard IKE is used for WLAN-level key management, it is preferably extended so that it knows not to give the negotiated keys to the IPsec stack. However, the link level and IPsec security associations (SAs), negotiated by the IKE, can be stored in the same security association (SA) database so that the WLAN portion of the kernel stack can easily find them.

The second example embodiment shown in FIG. 4 is a variant of the first embodiment shown in FIG. 3. Many of the features of the second embodiment are thus the same as those in the first embodiment and the description thereof is not repeated merely for the sake of convenience. The second embodiment differs from the first embodiment at least insofar as the IPsec Authentication Header (AH) is used for the authentication of the (uplink) data packets sent from the mobile terminal to the access point. In particular, the mobile terminal indicates the IPsec authentication keys (i.e., the authentication security association) to the access point (step 3a). Since payload packet authentication is needed in the access point for access control and charging, the packets are authenticated in the access point based on the IP end-to-end security authentication. In particular, the access point authenticates the payload data packets based on the IPsec Authentication Header (step 5). The need for additional WLAN link level authentication functions for the payload data traffic is thereby avoided. This method requires that the IPsec security protocol is used for all of the uplink traffic of the mobile terminal. Preferably, either AH or ESP with its own authentication extension is the outermost IPsec header in the transmitted packet (applied last by the sending end and first by the receiving end) so that the authentication header of the packet is not encrypted and unavailable to the access point.

In the second embodiment of FIG. 4, the mobile terminals and the access points must authenticate all of the data packets sent for mutual authentication and access control purposes. The needed cryptographic functions may be implemented as part of the WLAN layer as shown in FIG. 3, but the required features exist already in the IPsec kernel. In some cases, it is possible that the utilization of these kernel IPsec features, sometimes referred to as "packet circulation", for the sending and receiving of authenticated WLAN link level message will be beneficial. In other cases, it will not be sensible because of poor performance. Sometimes it may not even be possible because of missing operating system features. In those cases a better alternative is to implement the necessary authentication functions in the WLAN control process.

In the third exemplary embodiment shown in FIG. 5, a WLAN control process in a mobile terminal sends an IPsec authenticated message to an access point as part of WLAN MAC-level message. The WLAN control process in the access point receives the message and authenticates it using its IPsec kernel. The following phases are illustrated in FIG. 5:

1) The control process in the mobile terminal passes a data packet to be authenticated to IPsec kernel.

2) The IPsec kernel is adapted to build an Authentication Header (AH) packet and passes it back to the control process. The packets to receive this special handling may be determined on the basis of the port number reserved for the WLAN control process.

3) The WLAN control process builds the MAC-level message and sends it to the access point.

4) The MAC-level message containing the authentication data is received by the access point through a network interface.

5) The MAC-level message is passed to the control process of the access point by the network interface.

6) The control process of the access point determines that the MAC-level message contains IPsec authenticated data, and extracts the IPsec payload from the WLAN message. The extracted IPsec payload is sent through the network interface to the kernel to be authenticated (port number is reserved for the WLAN value).

7) The payload passes authentication process in the IPsec kernel and is passed back to the control process. The reception of the message confirms the authentication to the control process (the control process recognizes the packet from the reserved WLAN port number).

Any of the embodiments described above can be implemented to permit key management even when roaming. Indeed, global roaming can be accomplished utilizing the global certificate hierarchy created for the IPsec. Roaming is the process of a mobile terminal moving from one access point in a WLAN to another without losing its connection with the network. A re-association process is typically performed at each new access point when roaming. Since mutual authentication is carried out between the mobile terminal and the access point by the IKE at every association in the example embodiment, the result can be used in a subsequent re-association to authenticate the handover of a mobile terminal to a new access point when roaming.

Global WLAN roaming will become possible as soon as the IPsec certificate hierarchy becomes globally available.

While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A method of managing security keys in a wireless local area network having a mobile terminal, an access point and a server, the method comprising the steps of:
   obtaining first and second certificates from a certificate authority;
   associating the mobile terminal with the access point;
   using a certificate authority certificate, first certificate and private key with Internet Key Exchange (IKE) to generate a WLAN link level key and mutually authenticating the mobile terminal and the access point using the IKE; and
   using a certificate authority certificate, second certificate and private key with Internet Key Exchange (IKE) to generate IPsec authentication, encryption and decryption keys for data packets transferred between the mobile terminal and the server.

2. The method recited in claim 1, wherein the certificate authority certificate, private key, and the first and second certificates are stored in the mobile terminal.

3. The method recited in claim 2, wherein the certificate authority certificate, private key, and the first and second certificates are stored in the mobile terminal at the time of manufacture of the mobile terminal.

4. The method recited in claim 1, wherein the mobile terminal generates an authentication header for transferred data packets utilizing the IPsec encryption key.

5. The method recited in claim 1, wherein the server authenticates and decrypts data packets transferred from the mobile terminal utilizing the IPsec authentication and decryption keys.

6. The method recited in claim 5, wherein the data packets are transferred from the mobile terminal to the access point using WLAN link level encryption in addition to the IPsec encryption.

7. The method recited in claim 6, wherein the WLAN link level encryption comprises Wired Equivalent Privacy (WEP) encryption.

8. The method recited in claim 1, wherein the data packets are transferred from the mobile terminal to the access point without using WLAN link level encryption.

9. The method recited in claim 8, wherein the mobile terminal forwards the IPsec authentication key to the access point.

10. The method recited in claim 9, wherein the access point authenticates data packets from the mobile terminal using the IPsec authentication key forwarded from the mobile terminal.

11. The method recited in claim 1, wherein the mobile terminal sends an IPsec authenticated message to an access point as part of a MAC-level message of the wireless local area network.

* * * * *